Oct. 26, 1943.                H. C. ROBINSON                2,332,756
                              TOTALIZER SYSTEM
                           Filed Sept. 5, 1939        5 Sheets-Sheet 1
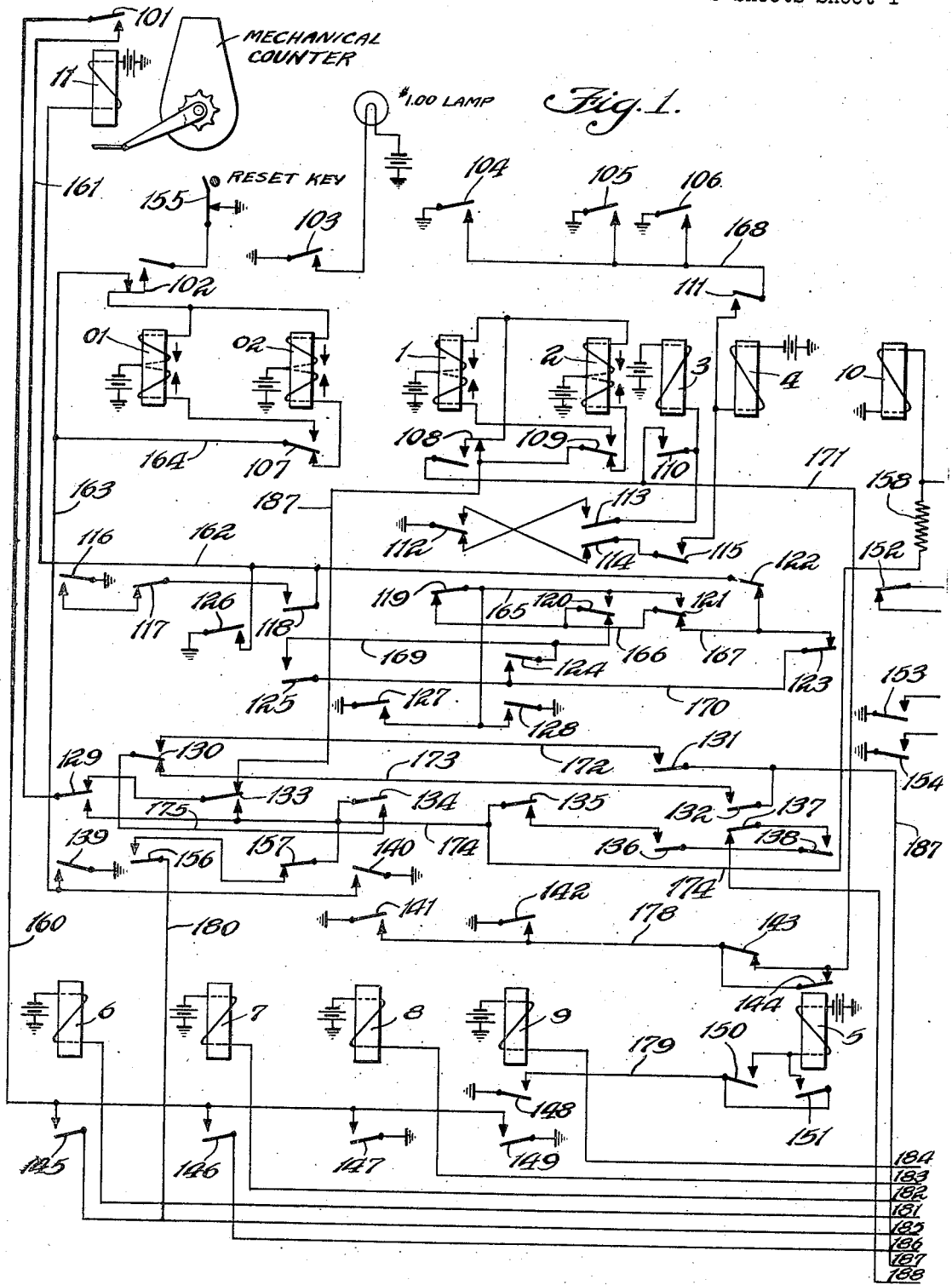
INVENTOR.
Harold C. Robinson
BY George H. Simmons
ATTORNEY.

Oct. 26, 1943.  H. C. ROBINSON  2,332,756
TOTALIZER SYSTEM
Filed Sept. 5, 1939  5 Sheets-Sheet 2
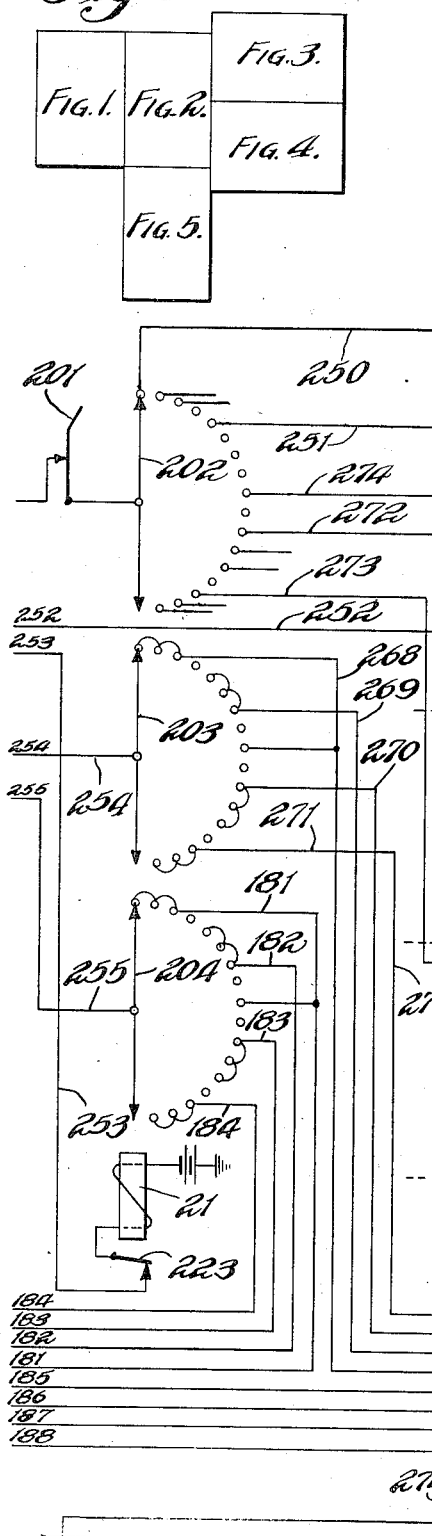
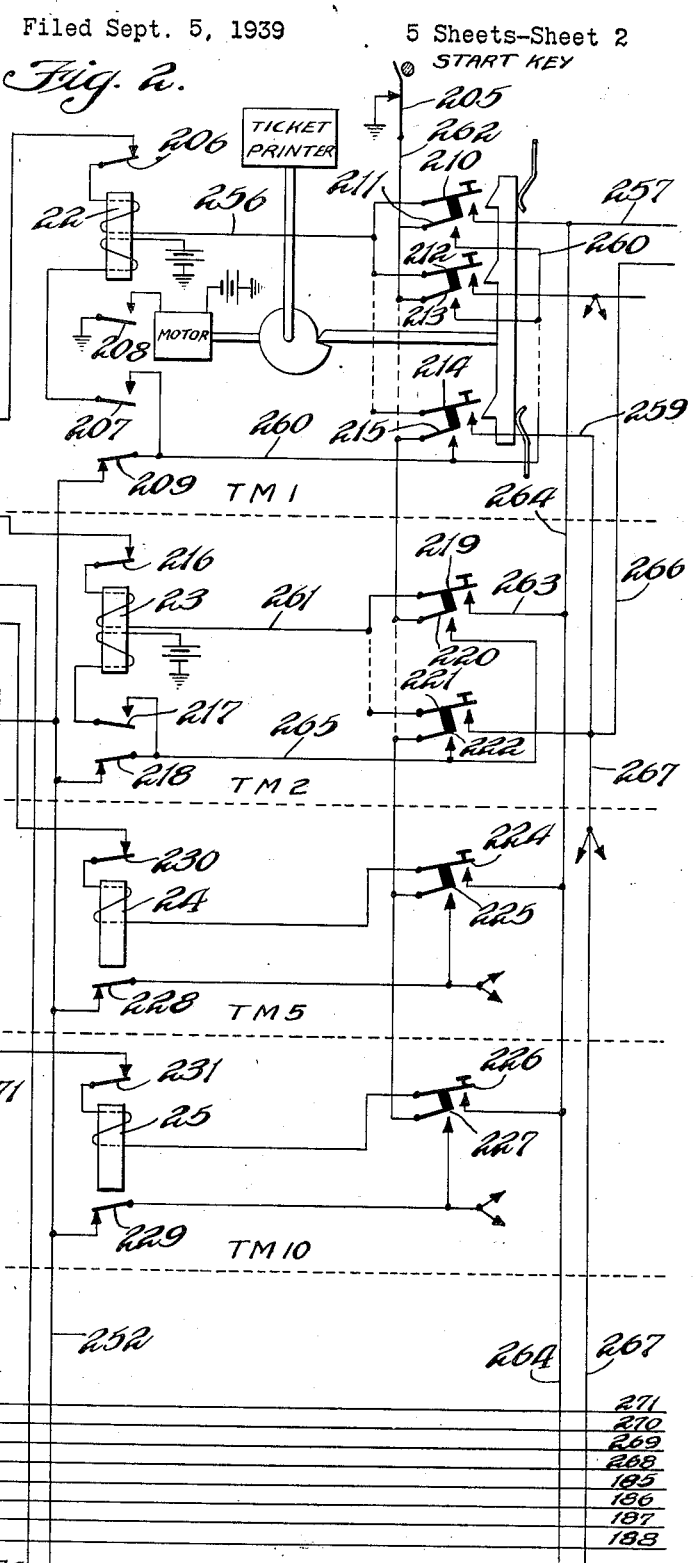
INVENTOR.
Harold C. Robinson
BY George H. Simmons
ATTORNEY.

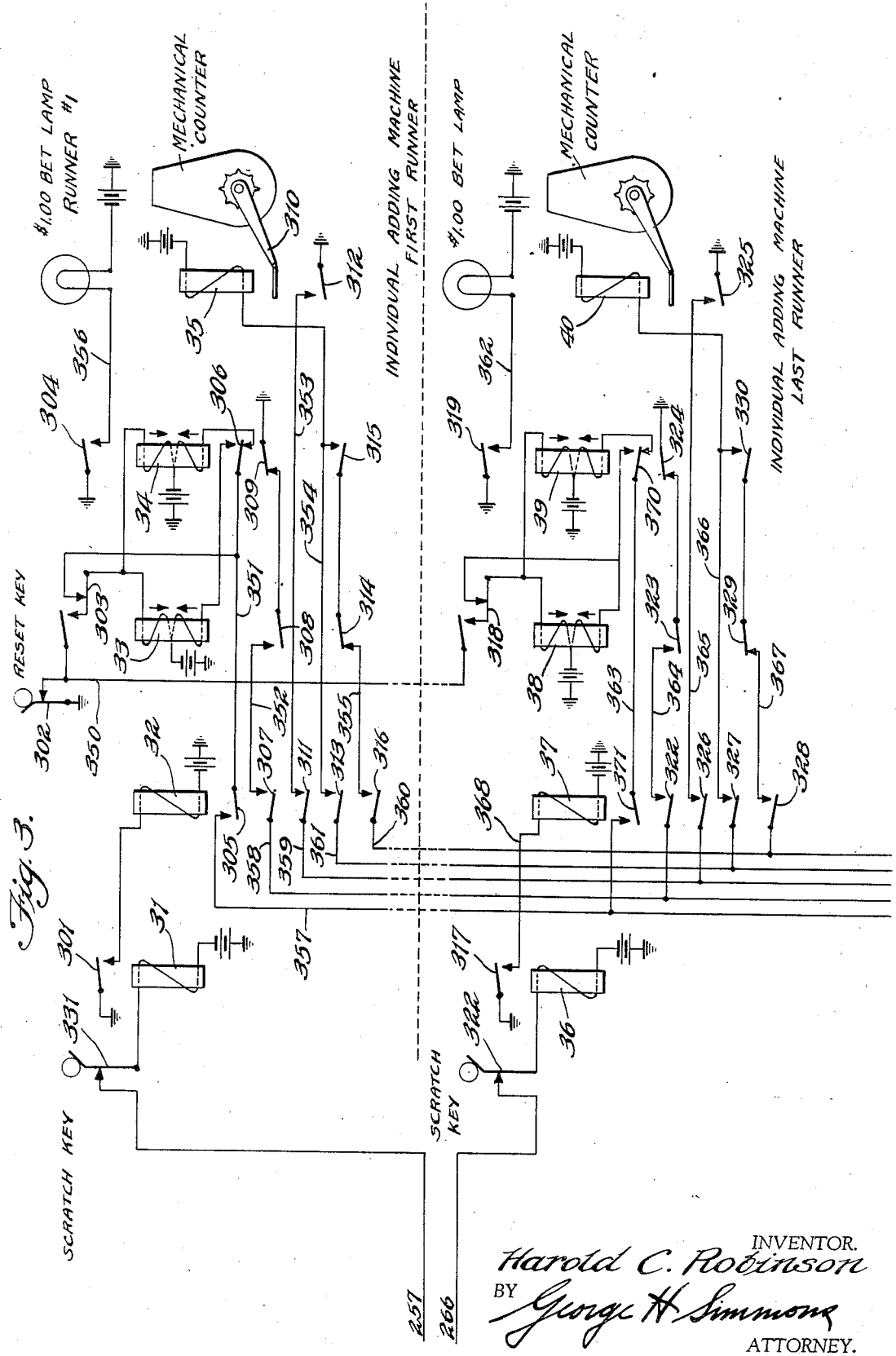

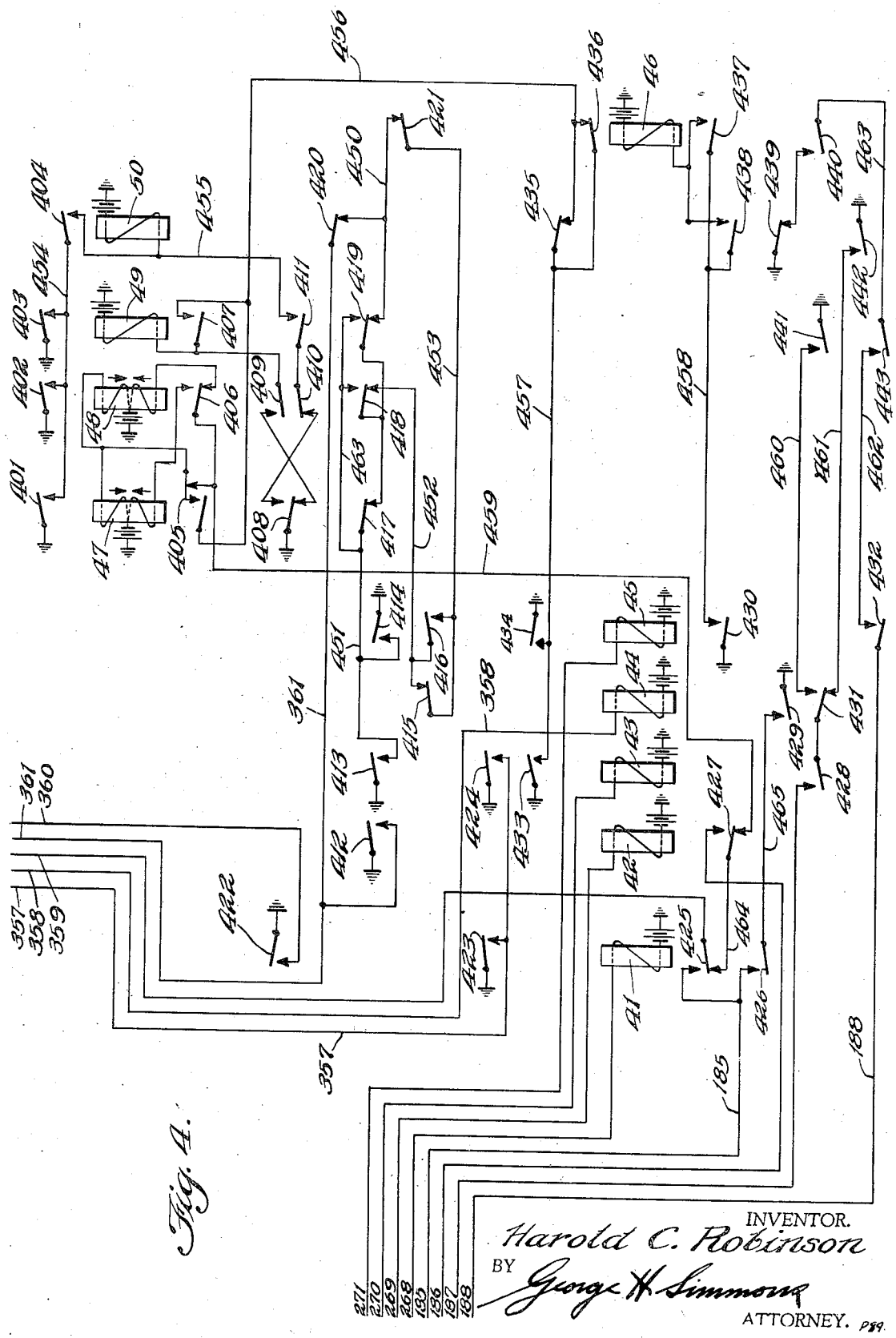

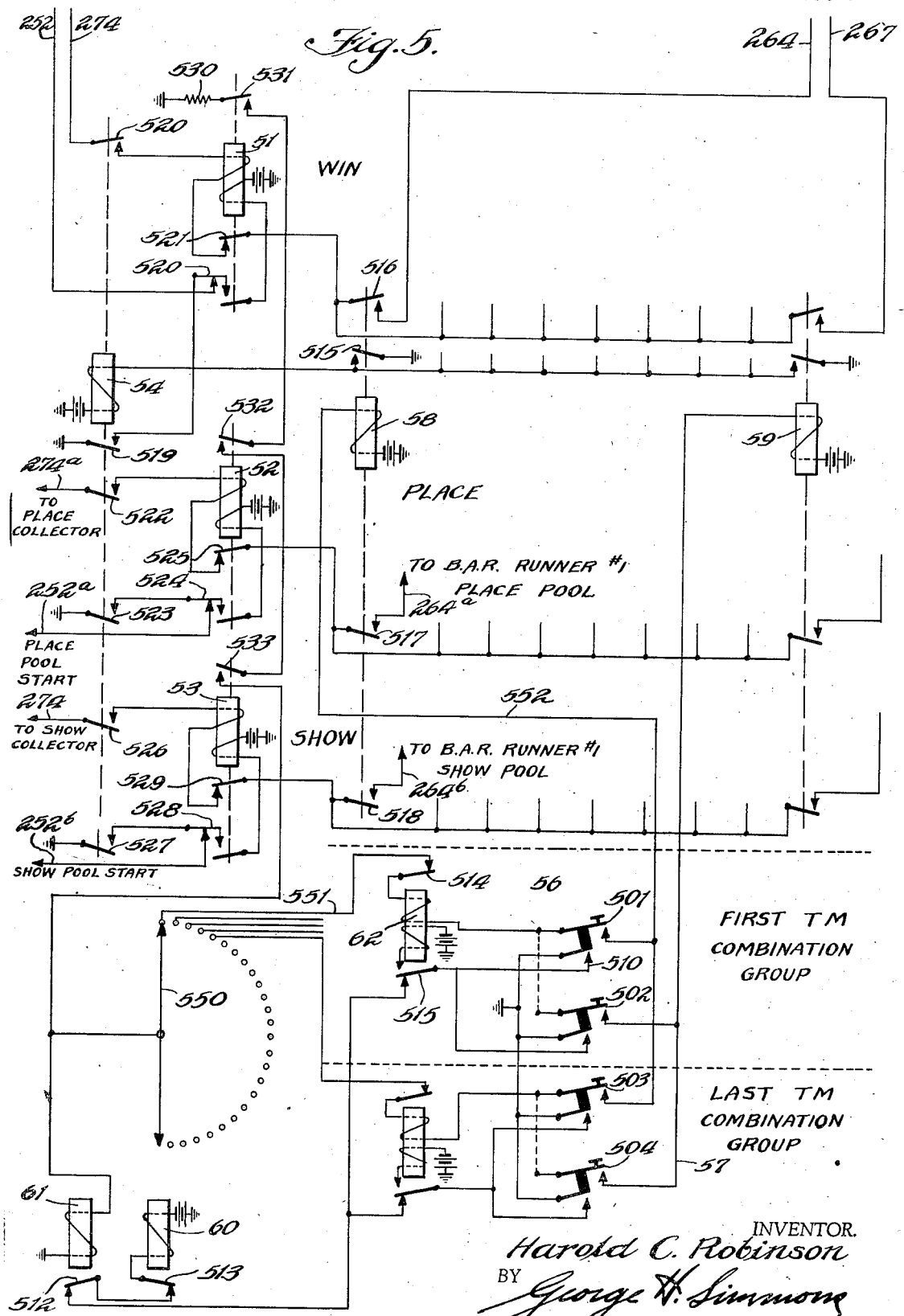

Patented Oct. 26, 1943

2,332,756

UNITED STATES PATENT OFFICE 2,332,756

TOTALIZER SYSTEM

Harold C. Robinson, Baltimore, Md., assignor to American Totalisator Company, Inc., Baltimore, Md., a corporation of Maryland Application September 5, 1939, Serial No. 293,367

15 Claims. (Cl. 235—92)

This invention relates to totalizer systems and has for its principal object the provision of a new and simplified system of this kind that is cheaper to manufacture, install, operate and maintain.

It is a main object of the invention to provide a simplified totalizer system that can be used under conditions where the cost of operating the systems of the prior art are prohibitive.

Still another object of the invention lies in the provision of a totalizer system that utilizes mechanical counters to register the issuance of tickets in a pool and also on the individual runner in that pool.

Still another object of the invention lies in the provision of a control means for the mechanical counters of the system arranged to operate those counters a predetermined number of times depending upon the value of the ticket to be issued.

Still another object of the invention lies in the provision of a totalizer system in which the ticket machines employed to print and issue the tickets are prevented from operating until the issuance of the ticket has been registered in a total adding machine and also in an individual runner adding machine.

Further objects of the invention, not specifically mentioned here, will be apparent from the detailed description and claims which follow, reference being had to the accompanying drawings in which a preferred embodiment of the invention is shown by way of example and in which:

Figure 1 is a schematic circuit diagram of the total adding machine of the system;

Figure 2 is a schematic circuit diagram of the collector and ticket machines;

Figure 3 is a schematic circuit diagram of two individual runner adding machines;

Figure 4 is a schematic circuit diagram of the control means for the group of individual runner adding machines;

Figure 5 is a schematic circuit diagram of the combination ticket issuing machines and control apparatus associated therewith; and Figure 6 is a view showing how the figures are to be assembled.

A totalizer may be defined as a device arranged to count and add separately operations of each kind performed by several devices of a group, and to simultaneously count and add the total number of operations of all kinds performed by the devices of the groups, and to display such sums on suitable indicators. Thus when used in connection with a group of ticket issuing machines which are capable of issuing a number of kinds of tickets, the totalizer through individual adding machines counts and displays the number of tickets of each kind issued by all of the ticket machines in the group and also through a total adding machine counts and displays the total number of tickets of all kinds issued by all of the ticket machines of the group.

In the totalizer systems of the prior art of which I am aware, so much equipment has been employed that the expense of manufacturing, installing, operating and maintaining the equipment has been so high as to be prohibitive in a large number of instances. This fact has been recognized heretofore and as a result totalizer systems of various sizes have been devised to meet the various conditions encountered. One of these systems, known as the senior totalizer system and capable of handling several hundred ticket machines, is employed in installations where the volume of business done justifies that many ticket machines. A somewhat smaller system, known as the intermediate totalizer, is employed in smaller installations and a still smaller system, known as the junior totalizer and capable of handling only a small portion of the number of ticket machines that the senior totalizer is capable of handling, is extensively used. The present invention has for its principal object the provision of a still smaller totalizer system so that the service rendered by the system will be available in many cases where costs have heretofore been prohibitive.

When used in connection with the issuance of pari-mutuel tickets at a race track, totalizers have heretofore been too expensive for small tracks such as are to be found at county fairs and the like. The present system is designed to render the service available to such tracks.

In the prior art systems, tickets issued by the ticket machines have been registered in a total adding machine which registers all of the tickets issued in a particular pool, regardless of the runner upon which the ticket is issued, and individual runner adding machines have been employed to register the tickets issued on the individual runners. The sums accumulated by the individual and total adding machines have been displayed at various points through display panels, these displays being changed at frequent intervals so that the total amount in a pool and the amount upon each individual runner is at all times visible. In addition, the display panels have been provided with odds indicators giving the probable odds on a particular runner in the win pool.

In a system embodying the teachings of the present invention, the total number of tickets issued in a particular pool is registered in a total adding machine, as before, and the total number of tickets issued upon each individual runner is registered in an individual runner adding machine in that pool. No display boards are employed to indicate these totals but rather the totals are indicated only upon the registers. If desired, odds boards may be employed and the probable odds indicated as before.

In the preferred embodiment of the invention, the total number of tickets issued is counted and indicated by mechanical counters of the so-called "Veeder" type, these counters being operated electro-magnetically. Preferably, the counters are arranged to indicate the total number of $2.00 tickets that have been issued. Since at the smaller tracks $1.00 tickets are frequently issued, provision is made to store such issuance in the adding machine and to operate the mechanical counter once each time the odd dollar ticket sales total $2.00. Each time a $5.00 ticket is issued, the mechanical counter is operated twice and the remaining odd dollar is stored in the control equipment to be later combined with another odd dollar sum to operate the counter.

Referring now to the drawings, in Figure 1 the total adding machine is shown to comprise a counter, control relays 1 to 9 inclusive and odd dollar storing relays O1 and O2, with a bet accepting relay 10 arranged to control the operation of the machine. Of these instrumentalities, relays 1 to 9 inclusive, the contacts controlled thereby and the circuits extending through said contacts are the control unit of the total adding machine. Connected to the total adding machine is a collector, for convenience shown as a mechanical stepping switch having wipers which pass over a bank of contacts, usually twenty-five contacts being accessible to each wiper. Connected to the bank contacts over which one of the wipers passes are a plurality of ticket machines grouped according to the value of tickets to be issued thereby. Thus, for example, ticket machine TM1 is assumed to be one of a group of ticket machines adapted to print and issue a group of $1.00 tickets, TM2 is a ticket machine for issuing $2.00 tickets, TM5 is a ticket machine for issuing $5.00 tickets and TM10 is a ticket machine for issuing $10.00 tickets. The particular type of ticket machines is not of the essence of the present invention as there are a number of devices of this kind available upon the open market which may be used. Thus, for example, the ticket machines shown and described in the Black patents, Nos. 1,886,626 and 1,886,627, have been found to be satisfactory and reference is here made to these patents for the details of construction and operation of the machine.

In Figure 2, ticket machine TM1 has been diagrammatically shown, those parts of the machine directly involved in the present invention being shown in sufficient detail to enable a clear understanding of the invention. It is sufficient to note here that each ticket machine has a key for each runner, and that usually the machines are provided with twelve keys. Upon being depressed, the key is mechanically locked in operated position and is released only when the function of printing and issuing the ticket has been completed. Each machine is provided with a control relay such as relay 22 of TM1 which is directly involved in the operation of the present invention. Ticket machine TM1 is shown with sufficient parts indicated to skeletonize its operation, however, to avoid unnecessary complication of the drawings, TM2, TM5 and TM10 have been shown only by showing the main circuit and start circuits and one key, but it will be understood that these machines are equipped with a plurality of keys and other instrumentalities as set out in the above Black patents.

Figure 3, above the dotted line, shows the relays and counter comprising an individual adding machine for the first runner and below the line a similar set of equipment for the last runner. It will be understood that in an installation there will be a number of individual adding machines corresponding to the number of keys on the ticket machines. If desired, each of these individual adding machines may be a complete unit such as the total adding machine shown in Figure 1, however, for the sake of simplicity, I prefer to separate from the individual adding machines as much as possible of the control equipment and to make such equipment common to all of the machines of the group which common equipment is shown in Figure 4 of the drawings. This can be safely done since the individual adding machines are operated one at a time, during which operation a particular machine has exclusive use of the common apparatus.

Associated with each individual adding machine is a scratch key, such as the keys 331 and 332, these keys being operated to open the circuit to the bet accepting relays, such as 31 and 36, when the particular individual runner corresponding to the adding machine is scratched. For convenience, keys 331 and 332 are designated as scratch keys. A reset key 302 is also provided and is adapted to be operated prior to preparing the system for use so as to insure that all relays in the individual adding machines will be in normal position.

Associated with the devices shown in the drawings are the usual supervisory alarm devices. However, since these devices form no essential part of the present invention, they have been omitted to avoid unnecessary complication of the drawings.

As shown in the drawings, the system employs the fundamental operating principles of the copending Levy application, Serial No. 100,464, filed September 12, 1936, now Patent 2,182,875, issued December 12, 1939, in that the collector is interposed between the total adding machine and ticket machines with its wiper connected to the bet accepting relay of the total adding machine. The individual runner keys of the ticket machines are multipled together and a circuit extended therethrough to the bet accepting relay of the individual adding machines. A fundamental operating circuit is extended through the bet accepting relay of the total adding machine and control relay of the ticket machine and the bet accepting relay of the individual adding machines in series, the adding machine relays operating at once over this circuit and the ticket machine relay remaining inactive until a checking circuit has been established. While this preferred form is shown, the teachings of the instant invention may be used in connection with other fundamental operating circuits, if desired.

In the operation of the system, after the sale of tickets has been completed, the counters of the individual adding machines are read to ascertain the total number of $2.00 tickets sold on that particular runner. To ascertain the $1.00 value of the tickets sold, the reading is multiplied by two. If the $1.00 lamp is lighted to indicate an odd dollar sale stored in the equipment, $1.00 is added to this sum. The total adding machine register is read in the same manner. Preferably, the counters are all restored to zero prior to the reconditioning of the system for the registering of further ticket sales.

Referring now to the drawings in more detail, a detailed description of the operation of the system will be given.

The totalizer is made ready for betting by closing key 201 to connect the total adding machine bet accepting relay 10 to the collector, by closing key 205 to place starting ground upon the ticket machines, and by closing scratch keys such as 331 and 332 for each runner in the race to place the runner adding machine individual to the runner in condition to register bets on that runner. Other main control keys are operated to condition the supervisory equipment, but since this supervisory equipment forms no part of the present invention, it has been omitted from the drawings to avoid unnecessary complications thereof.

Assume that the first bet that the system is called upon to handle is placed on ticket machine TM1 and that it is placed upon runner number 1. Since the ticket machine TM1 is the first ticket machine in the $1.00 group, the amount bet is assumed to be $1.00 and the operation is as follows:

FIRST $1.00 BET

The ticket seller depresses key 210 in the ticket machine TM1 to prepare the machine for the issuance of a ticket upon runner number 1. Responsive to this operation, a starting circuit is closed as follows:

From ground through closed springs 205 of the start key, start conductor 262, key spring 211 and its make contact, through the ticket machine start multiple 260, through spring 209 and its break contact, start conductor 252, through spring 152 and its break contact, conductor 253, through the break contact of and spring 223 on the collector motor magnet 21, through the winding of that magnet to battery. Motor magnet 21 operates over this circuit preparatory to advancing the wipers 202, 203 and 204 one step, breaks its own circuit by opening springs 223 and advances the wipers upon restoring to normal. Magnet 21 operates in a buzzer-like fashion to advance the wipers step by step until they are in the position in which they are shown in Figure 2.

A circuit may now be traced from ground through relay 10, key springs 201, wiper 202 and its bank contact to which conductor 250 is connected, conductor 250, through break contact of and spring 206 of the ticket machine control relay 22, conductor 256, through ticket machine key spring 210 and its make contact, conductor 251, through key 331, through the winding of runner bet accepting relay 31 to battery. Relays 10 and 31 are high speed, high sensitivity relays and operate over this circuit. Relay 22 is a low sensitivity marginal relay and will not operate in series with relays 10 and 31. The operation of relay 10 opens springs 152 thereby to break the start circuit to stop the collector and thereby maintain the foregoing circuit intact.

*Storing the bet in the runner adding machine*

The operation of relay 31 closes a circuit from ground through spring 301 and its make contact, through the runner slave relay 32 to battery, operating relay 32. Relay 32 carries a group of springs which insofar as the operation of the circuits is concerned could be carried by relay 31, however, this relay would be overloaded and consequently would operate slower if it carried this spring load and, therefore, I prefer to use the slave relay 32.

Collector wipers 203 and 204 are aligned with wiper 202 and are now engaging one of a series of multiple contacts corresponding to the $1.00 ticket machines, and upon the operation of relay 10 a circuit is closed from ground, through spring 153 and its make contact, conductor 254, wiper 203 and its bank contact, conductor 268, through the winding of the $1.00 selective control relay 41 in the runner adding machine control unit, Figure 4, to battery. Relay 41 energizes over this circuit and at springs 423 closes a bet registering circuit as follows:

From ground through spring 423 and its make contact, conductor 357, spring 305 and its make contact, conductor 351, through make before break spring 303 and its break contact, through the upper winding of differential relay 33 to battery, with a branch circuit extending through the upper winding of differential relay 34 to battery, with a second branch circuit extending through spring 306 and its break contact through the lower winding of relay 34 to battery. Differential relay 33 operates over this circuit since it is energized only through its upper winding but relay 34 remains in normal position since both its upper and lower windings are energized.

Relay 33 locks itself in operated position from ground through reset key 302, through the make contact of springs 303, through the upper winding of relay 33 to battery. The operation of make before break spring 303 transfers the circuit through the upper winding of relay 34 from conductor 351 to grounded reset conductor 350, without particular effect at the moment. A circuit may now be traced from ground through spring 309 and its break contact, through spring 308 and its make contact, conductor 352, through spring 307 and its make contact, conductor 358, through the winding of relay 44 of the runner adding machine common control unit, to battery. Relay 44 operates over this circuit.

A circuit may now be traced from ground through spring 429 and its make contact, conductor 465, spring 426 and its make contact, to the one dollar bet acknowledging conductor 185 leading to the total adding machine. However, at the moment this circuit is deemed to be incomplete.

*Storing $1.00 bet in total adding machine*

In the total adding machine the operation of relay 10 also closes a circuit from ground through spring 154 and its make contact, conductor 255, wiper 204 and its bank contact to which conductor 181 is connected, through the winding of the total adding machine $1.00 selective control relay 6 to battery. Relay 6 operates over this circuit. A circuit may now be traced from ground through spring 139 of relay 6 and its make contact, conductor 163, through break contact of and make before break spring 102, through the upper winding of differential relay O1 to battery, with a branch extending through the upper winding of differential relay O2 to battery, and a second branch extending through conductor 164, spring 107 and its break contact, through the lower winding of relay O2 to battery. Relay O1 operates over this circuit since it is energized only through its upper winding but relay O2 does not operate since it is energized through both its windings. Relay O1 upon operating locks itself to ground through reset key 155, through make contact of and spring 102, through the upper winding of relay O1 to battery. Operation of relay O1 transfers the circuit through the upper winding of relay O2 from ground on conductor 163 to ground on reset key 155, without particular effect at the moment.

Acknowledging the $1.00 bet

The operation of relay O1 having been thus completed, and relay 33 having been previously operated as explained above, the grounded acknowledging circuit previously traced to conductor 185 is extended through conductor 180, Figure 1, through spring 156 and its make contact, spring 157 and its break contact, acknowledging conductor 174, through resistance 158, to the previously traced circuit through relays 10, 22 and 31. Resistance 158 is thereby connected in parallel with relay 10, and the current flowing through the relay 22 is increased sufficiently to cause that relay to operate.

The operation of relay 22 closes spring 207, thereby to extend a circuit from battery through the lower winding of relay 22 to the grounded ticket machine start conductor 260 to lock relay 22 in its energized position. Relay 22 at spring 208 also closes a circuit for the motor of the ticket machine to operate that machine to print and issue a ticket and at the end of that operation to unlock key 210 to permit it to restore to normal.

The operation of relay 22 also opens springs 209 to open a point in the start circuit of the collector motor magnet 21 which operation is without effect at the moment since that circuit is held open by spring 152 of relay 10.

The operation of relay 22 also opens springs 206 thereby to break the circuit through relay 10, the upper winding of relay 22 and relay 31, and relays 10 and 31 restore to normal.

Clearing the runner adding machine

In the runner adding machine, restoration of relay 31 restores relay 32, thereby opening springs 305 to remove ground from the circuit extending from conductor 351 through spring 306 and its break contact, through the lower winding of relay 34, whereupon relay 34 operates over the previously traced circuit through its upper winding. Operation of relay 34 closes a circuit from ground through spring 304 and its make contact, conductor 356, through the $1.00 lamp to battery, lighting that lamp to indicate that there is a $1.00 bet stored on runner number 1. At springs 309, relay 34 opens the previously traced circuit through relay 44, this circuit having also been opened at springs 307, to permit relay 44 to restore. Restoration of relay 44 removes ground from $1.00 bet acknowledging conductor 185.

Thus it will be seen that the first $1.00 sale placed in the runner adding machines operates relay 33 and then relay 34 to store the sale, which is indicated by lighting the $1.00 lamp. Relays 33 and 34 may be termed either storing relays or accumulating relays, as desired. These relays store odd dollar sales, accumulating the same until the value that is registered on the counter is reached. If at the close of a sales period the sum in the adding machine is of an odd dollar value, the only indication of the odd dollar is in the operation of relay 34 and the lighting of the $1.00 lamp.

Clearing the total adding machine

Restoration of total adding machine bet accepting relay 10, at springs 154 opens the previously traced circuit for relay 6, permitting that relay to restore. Restoration of relay 6 opens springs 139 to remove ground from the previously traced circuit extending through conductor 164 and spring 107 and its break contact to the lower winding of relay O2, whereupon relay O2 operates over the previously traced circuit from reset key 155 through its upper winding. A circuit may now be traced from ground through spring 103 and its make contact through the $1.00 lamp of the total adding machinery to battery, that lamp burning to indicate that a $1.00 bet has been storing in the total adding machine.

Restoration of relay 10 at springs 153 opens the previously traced circuit for relay 41 of the runner adding machine control, permitting that relay to restore and thereby return the control to its normal position. Restoration of relay 10 recloses springs 152 to prepare the start circuit for the next operation of the equipment. This completes the registering of a $1.00 bet upon runner number 1 in the runner adding machine and in the total adding machine and the equipment is all in normal position in readiness for placing the next bet. Relays O1 and O2 like relays 33 and 34 may be called either storing relays or accumulating relays, as desired. Their function is identical with the function of relays 33 and 34 in that relays O1 and O2 are operated to store an odd dollar sale in the total adding machine and to control the $1.00 lamp which burns to indicate that there is an odd dollar sum stored in the total adding machine.

SECOND $1.00 BET ON RUNNER NUMBER 1

Assume that the second bet placed in the system is also placed upon runner number 1 and that it is a $1.00 bet. Under these conditions, the collector wipers will be located in the position in which they are shown and as soon as the runner number 1 key 210 in the ticket machine is closed, relays 10 and 31 will be energized. Relay 32 will energize with relay 31 and relay 41 in the runner adding machine control and relay 6 in the total adding machine will be energized over the previously traced circuits. The previously traced circuit extending ground over conductor 357 through spring 305 and its make contact will again be closed and will extend over conductor 351, through spring 306 and its make contact, through the lower winding of differential relay 33 to battery. Since relay 33 has been held in its operated position over a circuit extending through its upper winding, and both windings are now energized, and the relay will restore to normal. Restoration of relay 33 transfers the circuit through the upper winding of relay 34 from ground at reset key 302 to conductor 351 without effect at the moment since there is a ground on conductor 351, relay 34 remains operated and the runner No. 1 indicator lamp remains lighted.

A circuit may now be traced from ground through spring 422 of the selective control relay 41 and its make contact, conductor 360, through spring 316 and its make contact, conductor 355, spring 314 and its break contact, spring 315 and its make contact, through the winding of motor magnet 35 to battery. Motor magnet 35 operates and through its armature 310 advances the counter one step.

An acknowledging circuit may now be traced from ground through spring 312 of the motor magnet 35 and its make contact, conductor 353, spring 311 and its make contact, conductor 359, spring 425 of control relay 41 and its make contact, to the $1.00 bet acknowledging conductor 185.

Registering the second $1.00 bet in the total adding machine

In the total adding machine, the energization of relay 6 as above explained again closes the circuit extended through conductors 163 and 164, through spring 107, and its make contact, through the lower winding of relay O1 to battery, and since relay O1 is maintained operated through a circuit through its upper winding, both windings will be energized and the relay will restore to normal. Restoration of relay O1 transfers the circuit through the upper winding of relay O2 from ground through reset key 155 to conductor 160 but relay O2 remains in operated position since, at the moment, there is a ground on conductor 163. A circuit may now be traced from ground, through spring 116 and its make contact, through spring 117 and its break contact, through spring 118 and its make contact, conductor 162, through the winding of motor magnet 11 to battery. Magnet 11 operates over this circuit and operates the counter one step.

The registration of the second $1.00 bet in the runner adding machine and in the total adding machine having now been completed, the ground upon the acknowledging conductor 185 is extended through spring 145 and its make contact, conductor 160, through spring 101 of motor magnet 11 and its make contact, conductor 161, through spring 129 of relay 6 and its make contact, acknowledging conductor 174, through resistance 158 to the previously traced circuit, through relays 10, 22 and 31, whereupon relay 22 operates as previously described to initiate the operation of the ticket machine and to break the above circuit at springs 206 to permit relays 10 and 31 to restore.

Clearing the runner adding machine

Restoration of relay 31 restores relay 32, whereupon springs 305 are opened and ground is removed from the previously traced locking circuit through the upper winding of relay 34 to permit that relay to restore.

Restoration of relays 32 and 34 breaks the previously traced circuit through motor magnet 35 to permit that magnet to restore to normal, thereby to complete the operation of the runner adding machine under the conditions assumed.

Clearing the total adding machine

Restoration of total adding machine relay 10 at springs 153 opens the circuit of runner adding machine control relay 41 to permit that relay and the control unit to restore to normal. At springs 154 relay 10 opens the previously traced circuit for relay 6, permitting that relay to restore and at springs 139 remove ground from the circuit through the upper winding of relay O2, thereby to permit that relay to restore. Restoration of relay 6 and O2 at springs 116 and 118 break the circuit through the winding of motor magnet 11 of the register to restore that unit to normal, thereby to complete the operation of the total adding machine under the conditions assumed. Restoration of relay 10 also closes springs 152 to prepare the collector start circuit for the next operation.

PLACING A $2.00 BET

Assume now that a bet is placed through ticket machine TM2, Figure 2, and that this ticket machine is one of the group of ticket machines that issues $2.00 tickets. Assume further that the bet is also placed upon runner number 1. Under these conditions, the ticket seller will depress the ticket machine key 219, thereby to close the starting circuit from grounded start conductor 262 and through spring 220 and its make contact, ticket machine start multiple 265, spring 218 and its break contact, start conductor 252 over the previously traced circuit to motor magnet 21 of the collector, causing the collector to operate step by step until wiper 202 is moved into engagement with the bank contact to which conductor 251 is connected, at which time the betting circuit is closed from ground through relay 10 and wiper 202, conductor 251, through spring 216 and its break contact, through the upper winding of relay 23, conductor 261, key spring 219 and its make contact, conductor 263, multiple conductor 264 to conductor 257, through scratch key 331, through the winding of relay 31 to battery. Relays 10 and 31 operate over this circuit as before, and relay 32 operates under the control of relay 31.

Registering the bet in the runner adding machine

At the time that wiper 202 engages the contact to which conductor 251 is connected, wiper 203 will be in engagement with a contact of the group to which conductor 269 is connected. The operation of relay 10 breaks the starting circuit at spring 152 to maintain the wipers fixed in this position and a circuit may now be traced from ground through spring 153 and its make contact, conductor 254, wiper 203 and its bank contact, conductor 269 through the winding of runner adding machine selective control relay 42 to battery, relay 42 operating over this circuit. A circuit may now be traced from ground through spring 412 on the relay 42 and its make contact, conductor 361, spring 313 and its make contact, conductor 354, through the winding of motor magnet 35 to battery, magnet 35 operating over this circuit to operate the counter one step, thereby to register the placing of the $2.00 bet. The operation of motor magnet 35 closes a point in the acknowledging circuit by extending a circuit from ground, through spring 312 and its make contact, conductor 353, spring 311 and its make contact, conductor 359, spring 425 and its break contact, conductor 464, spring 427 and its make contact, to $2.00 acknowledging conductor 186.

Registering the bet in the total adding machine

The operation of relay 10 also closes a circuit from ground through spring 154 and its make contact, conductor 255, wiper 204 and its bank contact to which conductor 182 is connected, conductor 182 through the winding of total adding machine selective control relay 7 to battery, operating this relay.

The operation of relay 7, at spring 126 closes a circuit from ground, through the make contact of that spring, through conductor 162, through the winding of motor magnet 11 of the total adding machine counter, this magnet operating to operate the counter and thereby register the $2.00 bet. The checking circuit ground previously placed on conductor 186 now extends over a circuit through spring 146 of relay 7 and its make contact, conductor 160, through spring 101 of magnet 11 and its make contact, conductor 161, spring 129 and its break contact, through spring 133 and its make contact, through conductor 174, through resistance 158 to the previously traced circuit through relays 10, 23, and 31, whereupon relay 23 operates to operate the ticket machine to print and issue a ticket, as before. Relay 23 opens the circuit through relays 10 and 31, whereupon relay 10 falls back and opens springs 153 and 154 to open the previously traced circuits through relays 42 and 7, and relay 31 falls back to restore relay 32. The previously traced circuit through the motor magnet 35 is broken by the restoration of relays 42 and 32 whereupon that magnet restores and the springs 312 open the acknowledging circuit to restore the runner adding machine to normal and thereby complete the registering of the $2.00 bet therein.

Restoration of relay 7 breaks the previously traced circuit through the motor magnet 11, thereby to restore that magnet to normal to complete the registration of the bet in the total adding machine, and at springs 101, magnet 11 breaks a point in the acknowledging circuit, that circuit likewise being opened by the restoration of springs 146 of the relay 7. The $2.00 bet having thus been registered in the total adding machine and in the individual runner adding machine and the equipment restored to normal, the system is then ready for the accepting of another bet.

PLACING A $5.00 BET

As has been previously pointed out, the register mechanism of the runner adding machine and the register mechanism of the total adding machine are each operated once for each $2.00 bet received. When a $5.00 bet is placed, these registers must, therefore, be operated twice and in addition $1.00 of the $5.00 must be stored in the $1.00 bet storing mechanism. This gives rise to two operating conditions, the one occurring when a $5.00 bet is received at a time when there is no $1.00 bet stored in the mechanism and the other condition arising when a $5.00 bet is received at a time when there is a $1.00 bet stored in the register mechanism.

First we shall consider the former condition, that is, a $5.00 bet received where there are no $1.00 bets stored.

Ticket machine TM5 is one of a group of ticket machines issuing $5.00 tickets and for convenience we will assume that the $5.00 bet is placed on runner number one. Ticket machine key 224 is operated to select runner number one and start ground conductor 262 is extended through spring 225 and its make contact, thence through spring 228 and its break contact to start conductor 252, whereupon the motor magnet 21 of the collector operates to advance the wipers until wiper 202 engages the contact with which conductor 272 is connected. The bet accepting circuit is then extended from ground through relay 10 and wiper 202 as before and conductor 272, spring 230 and its break contact, through the upper winding of relay 24, spring 224 and its make contact, multiple conductor 264, conductor 257, through the winding of relay 31 to battery. Relays 10, 31 and 32 operate over this circuit as before.

*Registering the bet in the runner adding machine*

The operation of relay 10 at springs 153 closes a circuit from ground through conductor 254 and collector wiper 203 now engaged with a contact to which conductor 270 is connected, the circuit extending over that conductor through the winding of $5.00 selective control relay 43 in the runner adding machine control unit to battery. This relay operates over this circuit and the springs 424 closes a circuit from ground through the make contact of that spring to conductor 357 thence through make contacts 305 of relay 32, that relay having been operated as before, to relays 33 and 34 to energize relay 34 through both its windings and to energize relay 33 through its upper winding only, whereupon relay 33 operates. Operation of relay 33 transfers the previously traced circuits through the upper windings of relays 33 and 34 from grounded conductor 351 to reset conductor 350 without effect at the moment since this latter conductor is also grounded. A circuit is now extended from ground through spring 309 and its break contact, spring 308 and its make contact, conductor 352, through spring 307 and its make contact, conductor 358, through the winding of relay 44 to battery. Relay 44 operates over this circuit, without effect at the moment. Relays 46, 47, 48, 49 and 50 of the common control equipment, Figure 4, function to generate and count impulses delivered to the motor magnets, such as 35 or 40 of the counters in the individual adding machines. The number of pulses so generated and delivered depends upon which one of the selective control relays 41–45 inclusive is operated to initiate the operation of relays 46–50, inclusive, as will hereinafter appear. Relays 46–50, which may be called impulsing or control relays, in registering a $5.00 bet, function to operate the motor magnet of the counter twice.

The operation of relay 43 also closes a circuit from ground through spring 413 and its make contact, conductor 451, through spring 417 and its break contact, spring 419 and its break contact, conductor 450, spring 420 and its break contact, conductor 361, spring 313 and its make contact, conductor 354, through the winding of motor magnet 35 to battery, operating the motor magnet to thereby operate the counter one step.

The operation of motor magnet 35 closes a circuit from ground through spring 312 and its make contact, conductor 353, spring 311 and its make contact, conductor 359, spring 425 and its break contact, conductor 464, spring 427 and its break contact, conductor 459, thence through parallel paths, the one extending through spring 406 and its break contact, through the lower winding of differential relay 48 to battery and the other extending through main spring 405 and its break contact, thence through parallel paths the one through the upper winding of differential relay 47 to battery and the other through the upper winding of differential relay 48 to battery. Relay 47 operates over this circuit but relay 48 does not since it is energized through both of its windings.

Relay 43 also closes a circuit from ground through spring 433 and its make contact, conductor 457, thence through parallel paths through springs 435 and 436 and their respective break contacts, conductor 456, through the make contact of make before break spring 405, through the previously traced circuits through the upper winding of relays 47 and 48. Relay 47 is thus locked in energized position to the ground on conductor 456 and the upper winding of relay 48 is energized over a different circuit than the lower winding, without effect at the moment. The operation of relay 47, at springs 417, opens the previously traced circuit for the motor magnet 35, whereupon the motor magnet de-energizes to advance the counter one step to register $2.00 of the bet and to open springs 312 and thereby break the previously traced circuit from ground to conductor 459. Relay 48 being no longer energized through its lower winding but being energized from ground on conductor 456, through its upper winding, operates.

The operation of relay 48, at spring 418 and its make contact, closes a circuit from ground through spring 413 and its make contact, conductor 451, conductor 463, through the make contact of and spring 418, through spring 419 and its break contact, conductor 450, spring 420 and its break contact and thence over the previously traced circuit through conductor 361, through the motor magnet 35, whereupon the motor magnet again operates and re-applies ground through springs 312 to the conductor 459 over the previously traced circuit, that ground now extending the circuit through spring 406 and its make contact, through the lower winding of relay 47 to battery. Relay 47 now being energized through both of its windings restores to normal. A circuit may now be traced from ground through spring 408 and its break contact, spring 409 and its make contact, through the winding of relay 49 to battery, relay 49 operating over this circuit and locking itself through spring 407 and its make contact, to grounded conductor 456.

The operation of relay 49 moves spring 419 away from its break contact, thereby to open the previously traced circuit for motor magnet 35, causing that magnet to restore and operate the counter for a second time and to open springs 312 to remove ground from conductor 459. Relay 48 restores when ground is removed from conductor 459 without effect. The circuit through conductor 361 is opened at springs 419 and remains open so that motor magnet 35 is not again operated and the registration of the second $2.00 part of the $5.00 bet is thus completed.

The operation of relay 49 extends an acknowledging circuit from ground through spring 441, and its make contact, conductor 460, spring 431 and its make contact, relay 44 having been operated as above explained, spring 428 and its make contact to the $5.00 acknowledging conductor 187.

*Registering the $5.00 bet in the total adding machine*

The operation of relay 10 as above explained extends a circuit from ground, through spring 154 and its make contact, wiper 204 now engaging the contact to which conductor 183 is connected, through winding of $5.00 selective control relay 8, to battery, operating that relay.

The operation of relay 8 closes a circuit from ground, through spring 140 and its make contact, conductor 163, thence over parallel paths, the one extending through conductor 164, spring 107 and its break contact through the lower winding of relay O2 to battery, and the other extending through the break contact of and the main spring 102, thence over parallel paths, the one through the upper winding of relay O1 to battery, and the other through the upper winding relay O2 to battery.

Relay O1 operates over this circuit and locks itself through spring 102 and its make contact to ground on the reset key 155. Relay O2 being energized through both of its windings, does not operate at the moment. Relay O1 on operating transfers the circuit just traced through the upper winding of relay O2 to ground at key 155, without effect at the moment. Relays 1 to 5 inclusive of the total adding machine function to generate and count impulses delivered to the motor magnet 11 of the register in the total adding machine. The number of pulses so generated and delivered depends upon which one of the selective control relays 6 to 9 inclusive is operated to initiate the operation of relays 1 to 5 inclusive, as will presently appear. Relays 1 to 5, which may be called either impulsing or control relays in registering a $5.00 bet in the total adding machine under the conditions assumed, function to operate the motor magnet twice.

The operation of relay 8 also closes a circuit from ground, through spring 127 and its make contact, spring 119 and its break contact, spring 121 and its break contact, spring 122 and its break contact, conductor 162, through the winding of motor magnet 11 to battery, operating the motor magnet 11. At spring 101, magnet 11 closes a circuit which may be traced from ground, through spring 147 of the relay 8 and its make contact, conductor 160, spring 101 and its make contact, conductor 161, spring 129 and its break contact, spring 133 and its break contact, conductor 177, thence over parallel paths, the one extending through spring 109 and its break contact through the lower winding of differential relay 2 to battery, and the other, through the break contact of and main spring 108 thence through parallel paths, the one through the upper winding of relay 1 to battery and the other through the upper winding of relay 2 to battery.

Relay 1 operates over this circuit but relay 2, being differentially wound and being energized through both of its windings, does not operate. Relay 8 also closes a circuit from ground through spring 141 and its make contact, conductor 178, thence over parallel paths through springs 143 and 144 and their respective break contacts to conductor 171, through make contact of and spring 108, through the upper windings of relays 1 and 2 to battery, relay 1 being locked in operated position over this circuit. The circuit through the upper winding of relay 2 is thus transferred from ground on conductor 187 to ground on conductor 171, without effect at the moment.

The operation of relay 1 opens spring 119 from its break contact, thereby to break the previously traced circuit through conductor 162 to the motor magnet 11, whereupon that magnet restores to advance the counter one step and to removed ground from conductor 177 by opening springs 101.

Relay 2, being no longer energized through both its windings operates over its upper winding. The circuit for motor magnet 11 is thereupon closed for a second time from ground through spring 127 and its make contact, conductor 165, spring 120 and its make contact, conductor 166 and thence over the previously traced circuit to the magnet which is again operated and again closes spring 101 to re-apply ground to conductor 177. This grounded circuit is now extended through spring 109 and its make contact, through the lower winding of relay 1 to energize that winding, and since the upper winding is already energized, relay 1 restores it to normal position.

A circuit may now be traced from ground, through spring 112 of relay 1 and its break contact, spring 113 and its make contact, through the winding of relay 3 to battery, relay 3 operating over this circuit and locking itself to grounded conductor 171 through springs 110.

The operation of relay 3 at springs 121 opens the previously traced circuit for the magnet 11, causing that magnet to restore and operate the counter for a second time and to break the previously traced circuit to conductor 177 by opening springs 101, and relay 2 falls back. The circuit for motor magnet 11 is held open at springs 121 and the magnet is not again operated.

The register having been operated twice and the $1.00 having been registered in the relays, a checking circuit may now be traced from ground on conductor 187, through spring 131 and its make contact, conductor 172, spring 130 and its make contact, conductor 175, spring 134 and its make contact, conductor 174 through resistance 158 to the previously traced circuit through relays 10, 24, and 31, to operate the relay 24.

*Restoring the runner adding machine*

The operation of relay 24 starts the ticket machine TM5 functioning to print and issue a ticket and also the springs 230 break the previously traced circuit through relays 10 and 31 to permit those relays to restore. Restoration of relays 31 and 32 in the runner adding machine breaks the previously traced circuit from the ground on springs 424, through the lower winding of relay 34 to operate that relay over the circuit from ground through the reset key 302, through spring 303 and its make contact, through the upper winding of relay 34 to battery. Relay 34 upon operating at springs 304 closes a circuit through the $1.00 lamp, causing that lamp to indicate that a $1.00 bet is stored in the relay equipment. Relay 33 which is locked in operated position through its upper winding to ground on reset key 302, remains in operated position.

The de-energization of relay 10 opens the previously traced circuit for relay 43 by opening springs 153, thereby permitting that relay to restore. Restoration of relay 43 opens springs 433 to remove ground on conductor 456, thereby to permit relay 49 to restore. Restoration of relay 49 opens springs 441 to remove ground from the $5.00 bet accepting conductor 187.

*Restoring the total adding machine*

Restoration of relay 10 also opens springs 154 to open the previously traced circuit for relay 8 which restores and opens springs 141 to remove ground from locking conductor 171 to permit relay 3 to restore. Restoration of relay 8 also removes ground from conductor 163 thereby breaking the circuit through the lower winding of differential relay O2 to permit the relay to operate through its upper winding now grounded at spring 155. Relay O2 at springs 103 closes a circuit through the $1.00 lamp of the total adding machine, lighting that lamp to indicate the storing of $1.00 of the $5.00 bet in the total adding machine.

Restoration of relay 10 closes springs 152 to prepare the start circuit in readiness for the next operation. As soon as the ticket machine TM5 has completed the operation of issuing the ticket, it also restores to normal.

PLACING A SECOND $5.00 BET ON RUNNER ONE

Assume now that the next bet placed in the system is also a $5.00 bet upon runner number 1. Key 224 will again be depressed and the previously traced circuit for relays 10, 24 and 31 will be completed and those relays will be energized as before. Relay 10 will operate and close the previously traced circuits for relay 43 in the runner adding machine control and relay 8 in the total adding machine. The previously described circuits for sending two pulses to the motor magnet 35 of the register will be closed as before. However, since there is already a $1.00 bet stored in the relays 33 and 34 on the runner adding machine as indicated by the lighted condition of the $1.00 lamp and since there is an odd dollar in the $5.00 bet now being registered, and since the sum of these two $1.00 bets equals $2.00, the register must again be operated as follows:

Upon operating, relay 43 closes the previously traced circuit from ground through spring 424, conductor 357, spring 305 and its make contact, conductor 351, thence through spring 306 and its make contact, through the lower winding of relay 33 to battery. Relay 33 now being energized over both of its windings restores to its normal position and at spring 308 opens a second point in the circuit of relay 44 so that that relay remains in its normal position. Relay 49 having been energized to terminate the second impulse to the motor magnet 35 to permit that motor magnet to restore and relay 48 now being restored to its normal position at the end of the second pulse to the motor magnet 35 as explained above, a circuit may now be traced from ground, through spring 413 and its make contact, conductor 451, spring 417 and its break contact, spring 418 and its break contact, conductor 452, spring 415 of relay 44 and its break contact, conductor 453, spring 421 and its break contact, spring 420 and its break contact, thence over the previously traced circuit through conductor 361, through spring 313 and its make contact, and thence through the motor magnet 35 to battery, operating the motor magnet for a third time. Motor magnet 35 closes the previously traced circuit from ground, through springs 312 to the conductor 459, this circuit now extending through the upper winding of relay 47 to battery with branches extending through the upper and lower winding of relay 48 as before. Relay 47 operates over this circuit and closes a circuit from ground through spring 408 and its make contact, spring 410 and its break contact, spring 411 and its make contact, conductor 455, through the winding of relay 50 to battery, relay 50 operating and locking itself through springs 404 to conductor 454 which is grounded by springs 403 and 401. The operation of relay 50 breaks the circuit through motor magnet 35 at springs 420 to permit that motor magnet to fall back and complete the registration of the third $2.00 bet which as previously explained was composed of the $1.00 bet previously stored in the machine and the $1.00 from the $5.00 bet now being registered.

Operation of relay 50 closes a circuit from ground, through spring 442 and its make contact, conductor 461, spring 431 and its break contact, spring 428 and its make contact to the $5.00 acknowledging conductor 187.

*Registering the second $5.00 bet in the total adding machine*

In the total adding machine, upon the energization of relay 8 at the beginning of the operation, springs 140 place a ground on conductor 163 thereby to energize both windings of relay O1, relay O2 having been locked in energized position at the completion of the storing of the $1.00 part of the previous $5.00 bet. Relay O1 restores to normal and relay O2 remains energized for the moment.

The motor magnet 11 is operated through two pulses in the manner explained in the previous $5.00 bet at the end of which relay 3 becomes energized to break the circuit of the magnet by opening springs 121 during the second of these two impulses and relays 1 and 2 are both restored to normal as before. Thus, at the completion of the second pulse to the register motor magnet 11, a circuit may be traced from ground through spring 127 of relay 8 and its make contact, conductor 165, spring 121 and its make contact, spring 120 and its break contact, conductor 169, spring 125 and its make contact, conductor 170, spring 123 and its break contact, spring 122 and its break contact, through conductor 162 over the previously traced circuit through the motor magnet 11 to battery. The motor magnet is operated for a third time over this circuit and ground is placed upon conductor 177 as before to energize both windings of relay 2 and one winding of relay 1, whereupon relay 1 operates. Relay 1 being operated and relay 2 being normal, a circuit may be traced from ground through spring 112 and its make contact, spring 114 and its break contact, spring 115 and its make contact, through the winding of relay 4 to battery, operating relay 4 which locks itself through spring 111 to ground at spring 106. At springs 122, relay 4 breaks the circuit of motor magnet 11 to permit that magnet to restore to normal and complete the registering of the third $2.00 bet.

Upon completion of this operation, the grounded circuit previously traced to conductor 187 from the runner adding machine control unit is extended through spring 132 and its make contact, conductor 113 through spring 130 and its break contact, conductor 175, spring 134 and its make contact, conductor 174, through resistance 158 to the previously traced circuit through relays 10, 24 and 31 and relay 24 operates over this circuit.

The operation of relay 24 breaks the circuit of relays 10 and 31 to permit those relays to restore to normal and in the runner adding machine, restoration of relay 31 restores relay 32. Relay 34 which has been locked in operated position through the break contact of spring 303 to conductor 351 is restored to normal by the opening of this locking circuit at springs 305, thereby to open the circuit through the $1.00 lamp.

Relay 49 which is locked in operated position to ground on conductor 456 is restored upon the de-energization of relay 43 and this relay in turn restores relay 50 to normal so that all of the counting relays in the runner adding machine control are back to normal.

In the total adding machine, restoration of relay 10 breaks the circuit of relay 8 of the total adding machine control to permit relay O2 and the control relays 1, 3 and 4 all to restore to normal in readiness for the next operation.

PLACING $10.00 BET

Ticket machine TM10 is one of the group arranged to print and issue $10.00 tickets and assume that TM10 is operated to place a $10.00 bet on runner number 1. This is done by closing ticket machine key 226 whereupon spring 227 extends start ground from conductor 262, through spring 229 and its break contact, to start conductor 252 to close the previously traced circuit of the motor magnet for the collector, causing that collector to operate buzzer-like fashion so as to bring wiper 202 into engagement with the contact to which conductor 273 is connected. The bet accepting circuit is closed as before through relays 10 and 31 extending this time through the upper winding of relay 25 of the ticket machine TM5 and the key 226 and its make contact. The operation of relay 31 operates its slave relay 32 as before and the operation of relay 10 opens the start circuit at springs 152 and closes springs 153 and 154 as before, spring 153 closing a circuit from ground through wiper 203 which now engages the contact to which conductor 271 is connected. This circuit is extended through relay 45 of the runner adding machine control to battery, to operate that relay.

*Registering the bet in the runner adding machine*

In order to register the $10.00 bet, it is necessary that the register motor magnet be energized five times, this being accomplished as follows:

The operation of relay 45 closes a circuit from ground, through spring 414 and its make contact, spring 417 and its break contact, spring 418 and its break contact, spring 416 and its make contact, conductor 453, through spring 421 and its break contact, spring 420 and its break contact to conductor 361 with a branch path extending from the break contact to spring 417, through the break contact of spring 419, to the break contact of spring 420. The previously traced circuit from conductor 361 through the motor magnet 35 is closed to operate that magnet. Spring 312 closes a circuit from ground over the previously traced circuit to conductor 459, thence over the previously traced parallel paths through the upper winding of relay 47 and the upper and lower windings of relay 48, to cause relay 47 to operate. Relay 45 placed ground upon conductor 456 by closing spring 434 so that relay 47 upon operating locks up to this conductor, and the circuit through the upper winding of relay 48 is transferred to conductor 456 as before. The energization of relay 47 breaks the circuit of the motor magnet 35 by opening springs 417, causing the motor magnet to restore and open springs 312 thereby to remove ground from conductor 459.

Relay 48 being no longer energized through both of its windings operates through its upper winding so that at the moment both relays 47 and 48 are in operated position. The first pulse to the motor magnet is thus completed.

The second pulse is transmitted upon the operation of relay 48 by spring 418 moving into engagement with its make contact, ground being now placed on the conductor 361 from grounded conductor 451, through spring 418 and its make contact, spring 419 and its break contact and spring 420 and its break contact. The motor magnet is energized for a second time and again closes springs 312 to re-apply ground to conductor 459, whereupon relay 47 becomes energized through its lower, as well as its upper winding, and restores to its normal position. Restoration of relay 47 transfers the circuit through the upper winding of relay 48 back to conductor 459 without effect at the moment since there is a ground on that conductor.

A circuit may now be traced from ground through spring 408 and its break contact, spring 409 and its make contact, through the winding of relay 49 to battery, operating that relay which locks through its spring 407 and its make contact to grounded conductor 456. Relay 49 upon operating opens the circuit of motor magnet 35 by moving spring 419 from its break to its make contact, whereupon motor magnet 35 falls back to complete the second pulse and to open spring 312. This removes ground from conductor 459 thereby permitting relay 48 to restore to its normal position.

The circuit of motor magnet 35 is closed for a third time from grounded conductor 451 through spring 417 and its break contact, spring 418 and its break contact, conductor 452, spring 416 and its make contact, conductor 453, spring 421 and its break contact, spring 420 and its break contact to conductor 361, the motor magnet operating and again closing spring 312 to re-apply ground to conductor 459 thereby to energize relay 47 through its upper winding and relay 48 through both of its windings, to cause relay 47 to operate. On operating relay 47 transfer the circuit through the upper winding of relay 48 to conductor 456 without effect. Relay 47 upon operating breaks the circuit of the motor magnet 35 by opening springs 417, whereupon the motor magnet restores to end the third pulse and opens springs 312. Relay 47 upon operating also closes circuit from ground through spring 408 and its make contact, spring 410 and its break contact, spring 411 and its make contact through the winding of relay 50 to battery, energizing relay 50 at the springs 420, opens another point in the circuit of motor magnet 35. Relay 50 locks through springs 404 to grounded conductor 454. The energization of relay 50 also opens, at spring 435, a point in the circuit over which ground is placed on locking conductor 456 and at springs 438 closes a circuit which may be traced from ground through spring 430 of relay 45 through conductor 458, springs 438 and its make contact, through the winding of relay 46 to battery, relay 46 operating over this circuit and locking itself to conductor 458 through springs 437.

Relay 46 also opens springs 436 thereby to remove ground from conductor 456 to permit relay 47 and relay 49 to restore to normal. Relay 48 already being at normal, ground is removed from conductor 454 to permit relay 50 to restore to normal.

The circuit of the motor magnet is closed for the fourth pulse over a circuit from grounded conductor 451, through spring 417 and its break contact, spring 419 and its break contact, spring 420 and its break contact to conductor 361, the magnet 35 operating to close springs 312 and again apply a ground upon conductor 459 to complete the parallel circuits through the upper winding of relay 47 and both windings of relay 48, thereby to operate relay 47 which transfers the upper winding of relay 48 to grounded conductor 456 and breaks the circuit of the motor magnet by opening springs 417, whereupon motor magnet 35 falls back to end the fourth pulse and to remove ground from conductor 459.

As soon as ground is removed from conductor 459, the circuit through the lower winding of relay 48 is broken, whereupon the relay operates through its upper winding. The circuit of motor magnet 35 is closed for the fifth time from ground conductor 451 through conductor 463, spring 418 and its make contact, spring 419 and its break contact, conductor 450, through spring 420 and its break contact, to conductor 361, motor magnet 35 operating and again closing spring 312 to re-apply ground to conductor 459, whereupon both windings of relay 47 become energized and that relay moves to its normal position. A circuit may now be traced from ground through spring 408 and its break contact, spring 409 and its make contact, through the winding of relay 49, that relay operating to open the circuit of the motor magnet 35 by moving spring 419 from its break to its make contact and to lock itself through spring 407 to conductor 456. The previously traced circuit over which the third impulse to the motor magnet was transmitted is now open at spring 421 on relay 5 so that no more pulses can be sent to the motor magnet and the registration of the $10.00 bet is therefore complete, the magnet having been operated five times.

An acknowledging circuit may now be traced from ground, through spring 439 and its break contact, spring 440 and its make contact, conductor 463, spring 443 and its make contact, conductor 462, spring 432 and its make contact to the $10.00 acknowledging conductor 188.

*Registering the $10.00 bet in the total adding machine*

In the total adding machine, the operation of relay 9 closes a circuit for the motor magnet 11 of the register which may be traced from ground, through spring 128 and its make contact, spring 119 and its break contact, spring 121 and its break contact, spring 122 and its break contact, conductor 162, through the winding of the magnet to battery. The magnet operates on this first pulse to close springs 101.

A circuit may now be traced from ground, through spring 149, conductor 160, spring 101 and its make contact, conductor 161, spring 129 and its break contact, spring 133 and its break contact, conductor 177, thence over parallel paths through the upper winding of relay 1 and the upper and lower windings of relay 2, relay 1 operates over this circuit and the springs 119 open the circuit of magnet 11 to permit that magnet to fall back, thereby to complete the first pulse.

Relay 9, at springs 142 closes a circuit from ground to conductor 178, the circuit extending therefrom through parallel paths through springs 143 and 144 to conductor 171. On operating, relay 1 locks itself through its upper winding and springs 108 to conductor 171 and at the same time transfers the circuit for the upper winding of relay 2 from conductor 177 to conductor 171, without effect at the moment since both conductors are grounded.

Opening the springs 101 removes ground from conductor 177, whereupon the circuit through the lower winding of relay 2 is broken and that relay operates over the circuit through its upper winding. The operation of relay 2 closes the previously traced circuit from ground to spring 128 through conductor 165, through the make contact of spring 120, through conductor 166 and thence over the previously traced circuit through the motor magnet 11 to battery to operate that magnet for a second time.

Springs 101 re-apply ground to conductor 177 thereby to energize relay 1 through both of its windings to cause that relay to restore to normal. The circuit through the upper winding of relay 2 is transferred back to conductor 177 by springs 108, without effect at the moment. A circuit may now be traced from ground through spring 112 and its break contact, spring 113 and its make contact, through the winding of relay 3 to battery, operating relay 3 which locks through spring 110 to grounded conductor 171. Relay 3 opens spring 121 from its break contact thereby to break the circuit of motor magnet 11 to cause that motor magnet to fall back at the end of the second pulse, spring 101 removing ground from conductor 177. Relays 1 and 2 now being de-energized are both in normal position.

The circuit of motor magnet 11 is closed for a third time from ground on conductor 165, through spring 121 and its make contact, conductor 166, spring 120 in its break contact, spring 124 and its make contact, conductor 170, to spring 123 and its break contact over the previously traced circuit to the magnet. The magnet 11 operates for a third time and spring 101 again places ground upon conductor 177.

The grounded circuit through conductor 177 extends over the same parallel paths as for the first pulse, that is through the upper winding of relay 1 and through both windings of relay 2, operating relay 1 which transfers the circuit through the upper winding of relay 2 to conductor 171, without effect at the moment.

A circuit may be traced now from ground, through spring 112 and its make contact, spring 114 and its break contact, spring 115 and its make contact, through the winding of relay 4, relay 4 operating over this circuit and locking itself in energized position to grounded conductor 168 through springs 111.

A circuit may now be traced from ground, through spring 148 and its make contact, conductor 179, spring 150 and its make contact through the winding of relay 5 to battery, operating the relay 5 which locks through spring 151 to grounded conductor 179.

Relays 4 and 5 now both being operated, springs 143 and 144 are both open so that ground is removed from conductor 171. The circuit of the motor magnet having been broken by the opening of springs 122 and relay 4 energized, the magnet is restored to end the third pulse and the springs 101 remove ground from conductor 177 so that relays 1, 2, 3 and 4 are all permitted to restore to their normal position.

The circuit of motor magnet 11 is closed for the fourth time over the same circuit as for the first pulse, and for a fifth time over the same circuit as the second pulse, the magnet is prevented from operating a sixth time since the circuit for the third pulse to the magnet is held open by springs 123 on the relay 5, and the registration of the $10.00 bet is, therefore completed.

The checking circuit ground on the $10.00 acknowledging conductor 188 is now extended from ground through spring 137 and its break contact, spring 138 and its make contact, spring 136 and its make contact, spring 135 and its make contact to conductor 174 through the resistance 158 to the previously traced bet accepting circuit through relays 10, 25 and 31. The relay 25 operates over this circuit to initiate the operation of the ticket machine TM5 and at springs 231 opens the circuit for relays 10 and 31 to permit them to restore to normal and thereby restore to normal the runner adding machine and the total adding machine in the hereinbefore explained manner.

In the foregoing description of the placing of a $1.00 bet, $2.00 bet, $5.00 bet and $10.00 bet, and registering the same in the total adding machine and individual runner adding machine corresponding to the selected runner, no mention has been made of the pool in which the bets have been placed. As is well understood by those skilled in the art, the totalizer equipment such as hereinbefore described is employed in triplicate, that is, a complete set of equipment for the win pool, a similar set of equipment for the place pool and a third set of equipment for the show pool. It also frequently happens that combination tickets are to be sold, that is, a single ticket is issued for three bets on a particular runner, one bet for that runner to win, a second bet for that runner to place and a third bet for that runner to show. In Figure 5, I have shown equipment for issuing and registering such combination tickets.

Assume now for the moment that the equipment shown in Figures 1 to 4 inclusive is in the win pool and that the combination tickets are for a $1.00 bet in each of the win, place and show pools, the operation of the system will be as follows:

In the combination group, there is provided a win group control, relay 51, a place bet group control, relay 52, and a show bet group control, relay 53, together with a master combination control relay 54. Ticket machines 56 and 57 are respectively the first and last ticket machines in the combination group, these ticket machines being identical with the others insofar as the electrical circuits are concerned. Each ticket machine is provided with a key for each runner, the key 501 of the first ticket being assumed to be the key for runner number 1 and key 502 the key for the last runner. Relay 58 is connected in circuit with the first runner keys such as 501 and 503 of all of the ticket machines in the group and relay 59 is connected in circuit with the last runner key such as 502 and 504 in all of the ticket machines of the group. It will be understood that additional keys and relays have been provided but these have been omitted from the drawings to avoid unnecessary complication thereof.

PLACING A COMBINATION BET ON RUNNER NUMBER 1

Assume for the moment that ticket machine 56 is operated to place a combination bet on runner number 1. Key 501 will be depressed thereby to close a circuit from ground through spring 510 and its make contact, spring 511 and its break contact, spring 512 and its break contact, spring 513 and its break contact, through the winding of motor magnet 60 to battery, operating the motor magnet which breaks its own circuit by opening springs 513. Motor magnet operates in buzzer-like fashion to advance wiper 550 until that wiper engages the contact to which conductor 551 is connected at which time a circuit may be traced from ground through relay 61, wiper 550, conductor 551, spring 514 of relay 62 and its break contact, through the upper winding of relay 62, through key spring 501 and its make contact, conductor 552, through the winding of relay 58 to battery. Relay 61 operates over this circuit and at spring 512 opens the circuit of the motor magnet 60 to bring the collector to rest. Relay 58 also operates over this circuit. However, ticket machine relay 62 does not operate at the moment.

The operation of relay 58 at springs 515 closes a circuit from ground through the winding of relay 54 to battery to operate relay 54. At springs 516, relay 58 closes a point in the bet accepting circuit of the win pool, that circuit being, at the moment, open elsewhere. At springs 517, relay 58 closes a point in the bet accepting relay of the place pool and at springs 518 a point in the bet accepting circuit of the show pool which circuits are likewise, at the moment, incomplete.

The operation of relay 54, at springs 519, closes a circuit which may be traced from ground through that spring and its make contact, spring 520 and its break contact, start conductor 252 of the win pool, spring 152 and its make contact of the bet accepting relay 10 in the total adding machine of the win pool, through spring 223 and the motor magnet 21 of the win pool collector to battery, operating that collector step by step until its wiper 202 engages the contact to which conductor 274 is connected. A circuit may now be traced from ground through relay 10 of the total adding machine, wiper 202, conductor 274, spring 520 and its make contact, through the upper winding of relay 51, through spring 521 and its break contact, spring 516 and its make contact, conductor 264, conductor 257, through the winding of relay 31 to battery. Relays 10 and 31 operate over this circuit but relay 51 does not operate.

At the time that wiper 202 engages the contact to which conductor 274 is connected, wiper 203 will be in engagement with the contact to which conductor 268 is connected and the previously traced circuit for relay 41 of the individual runner adding machine control will be closed and that relay will operate to cause the storing of a $1.00 bet in the individual runner adding machine number 1, that registration being accomplished in the hereinbefore explained manner. Wiper 204 will be in engagement with the contact to which conductor 281 is connected to close the previously traced circuit for relay 6 of the total adding machine, operating that relay to effect the storing of a $1.00 bet in the total adding machine. At the completion of this operation, the hereinbefore described checking circuit will be closed through resistance 158, whereupon relay 51 will operate and through spring 520 and its make contact lock itself in operated position through its lower winding to ground at spring 519.

Simultaneously with the foregoing operation, relay 54, upon operating, at springs 523 places ground on a circuit extending through springs 524 of relay 52 to the place pool start conductor 252a, thereby to close a circuit for the collector of the start pool which is exactly the same as that just described for the win pool. When that collector has selected the contact to which conductor corresponding to conductor 274 is connected, the bet accepting relay 10 of the place total adding machine will extend a circuit to conductor 274a, that circuit extending through spring 522 and its make contact, through the upper winding of relay 52, through spring 525 and its break contact, spring 517 and its make contact, and thence to conductor 264a which leads to the bet accepting relay of the number 1 runner in the place pool, which relay corresponds to relay 31. The $1.00 bet is thereupon stored in the individual runner adding machine and the total adding machine of the place pool in exactly the same manner as hereinbefore described, at the end of which operation the acknowledging circuit through resistance 158 of the total adding machine of the place pool increases the current flow to operate relay 52, which locks itself through its lower winding and spring 524 and its make contact to ground through spring 523.

Simultaneously with the foregoing operations, relay 54 at springs 527 extends start ground through spring 528 to start conductor 252b of the show pool, thereby to operate the collector of the show pool in the hereinbefore described manner to establish a circuit from the bet accepting relay 10 of the total adding machine of the show pool and conductor 274b through the upper winding of relay 53, spring 529 and its break contact, spring 518 and its make contact to conductor 264b leading to the bet accepting relay of the individual runner adding machine number 1 in the show pool, that relay corresponding also to relay 31. A $1.00 storing is thereupon made in the total adding machine and individual runner adding machine of the show pool in the hereinbefore described manner and at the end of the registration the current flowing in the circuit is increased to operate relay 53 which locks itself through its lower winding and spring 528 to ground at spring 527.

A circuit may now be traced from ground through resistance 530, through spring 531 of relay 51, spring 532 of relay 52, spring 533 of relay 53 and their respective make contacts through wiper 550, conductor 551, spring 514 and its break contact, thence over the previously traced circuit through the upper winding of relay 62 and relay 58 to battery. Relay 62 operates over this circuit to initiate the operation of the ticket machine to cause that machine to print and issue a ticket. Relay 62 upon operating opens at springs 514 the previously traced circuit for relay 58, whereupon that relay falls back and at springs 515 opens the previously traced circuit for relay 54 to permit that relay to restore. Restoration of relay 54 opens the locking circuits for relays 51, 52 and 53 to permit those relays to restore, thereby to restore the combination ticket group to normal in readiness for the next operation. As soon as the ticket machine 56 has completed its operation, spring 501 is restored as before.

As shown in Figure 5, the combination ticket machine group collector, including wiper 550, has access to five ticket machines, the first and last of which are shown. It will be understood that the other bank contacts over which wiper 550 passes will be multipled to give that wiper access to the five ticket machines in sequence. As shown in Figure 2, conductor 274 is connected only to one bank contact. It will be understood that this wiper may be multipled into other bank contacts so that the combination ticket machine group will be available to the wipers of the collectors more frequently.

From the foregoing it will be seen that the totalizer system of my invention is possessed of many advantages. Inexpensive counters are employed to register the sale of tickets, those counters being operated once or a plurality of times depending upon the value of the ticket sale being registered. Each time the counter is operated a $2.00 sale is registered and lamp means are provided to indicate the presence of odd dollar sales in the equipment. The simple relatively inexpensive equipment employed permits the system to be used under conditions under which the larger systems of the prior art would be prohibitive in cost.

While I have chosen to show and describe a preferred embodiment of my invention, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. In a totalizer system, a total adding machine including a control means and an accepting relay, a plurality of ticket machines each arranged to print tickets of a particular value, a collector for extending a circuit from said accepting relay to said ticket machines one at a time, a plurality of individual adding machines each including an accepting relay, means in said ticket machines for extending said circuit from said total adding machine accepting relay to the accepting relay in one of said individual adding machines to operate said accepting relays, a control means common to said plurality of individual adding machines, means controlled by said operated individual adding machine accepting relay for connecting said common control means to said individual adding machine, means in said collector for extending a circuit from control means operated by said total adding machine relay to said common control means to operate said means to control said individual adding machine to register a value therein corresponding to the value of the tickets printed by the ticket machine to which the total adding machine is then connected, and means in said collector for extending a circuit from other means operated by total adding machine accepting relay to said total adding machine control means to operate said means to control said total adding machine to register the same value therein.

2. In a totalizer system, a plurality of individual runner adding machines, a pair of relays in each of said machines, a counter in each adding machine, electro-magnetic means for operating said counter, control relays common to said plurality of individual adding machines, means for selectively connecting said common control relays to said adding machines one at a time, and a circuit for the electromagnetic means of the adding machine to which said common control relays are connected, which circuit extends through contacts on the pair of relays in said adding machine and on said common control relays to operate said electro-magnetic means.

3. In a totalizer system, a total adding machine, a plurality of individual runner adding machines, an electro-magnetically operated counter in each of said individual runner adding machines and said total adding machine adapted to register two-unit values, accumulating relays in each of said adding machines adapted to store single-unit values, a ticket printing machine adapted to print five-unit value tickets, means for connecting together said total adding machine, said ticket machine and a selected one of said individual runner adding machines, and means for operating the counters of both the total and individual adding machines each twice and the accumulating relays of both the total and individual adding machines each once to register and store the five-unit value in said total and individual adding machines.

4. In a totalizer system an adding machine containing, a pair of relays for accumulating single-unit values, an electro-magnetically operated counter arranged to count two-unit values, relay means for controlling said counter, a five-unit value ticket machine, means for operating said ticket machine to establish a connection with said adding machine, means in said adding machine operated over said connection for actuating said relay means to operate said counter twice and to actuate one of said pair of accumulating relays to store a one-unit value, and means for controlling said relay means to operate said counter a third time when said one-unit value is added to a one-unit value previously stored in said pair of accummulating relays.

5. In a totalizer system, a counter, a motor magnet for said counter, a selective control relay for each value to be registered on said counter, a pair of pulsing relays, control relays, circuits for said control relays controlled by said pulsing relays, a circuit for said motor magnet extending through a chain of contacts controlled by said control relays, pulsing relays and selective control relays, an operating circuit for said pulsing relays controlled by said motor magnet and selective control relays, means for operating one of said selective control relays, and means including said chain circuits and said pulsing and control relays for operating said motor magnet the number of times necessary to register a number corresponding to said operated selective control relay.

6. In a totalizer system, an adding machine, a pair of differential relays and a control relay therein, a ticket machine, means for connecting said ticket machine to said adding machine, said means establishing a circuit over which said control relay is operated, means for preparing a circuit for said differential relays, means closed by said control relay in operated position for closing said circuit to energize both of the windings of one of said differential relays and one of the windings of the other one of said differential relays to operate the latter relay, means in said ticket machine for opening the circuit over which said control relay is operated to restore said relay, means for holding said operated differential relay in operated position and for operating the other differential relay upon the restoration of said control relay, and means controlled by said other differential relay in operated position for indicating an operation of said ticket machine.

7. In a totalizer system, a counter, a magnet for operating said counter, a control relay group, a pair of differentially wound relays included in said group, a circuit for said magnet extending through a chain of contacts in said control relay group, means for closing said circuit to operate said magnet, contact means closed by said magnet, circuit means controlled by said magnet contact means for energizing both windings of a second and one winding of a first one of said differentially wound relays to operate said first one of them, said first differential relay on operating locking itself and opening said magnet circuit to permit the magnet to restore, said magnet upon restoring operating said magnet contact means to open the circuit through one winding of said second differential relay, said second differential relay operating to reestablish said magnet circuit to operate the magnet thereover, said magnet re-closing said magnet contact means to close a circuit through the second winding of said first differential relay to restore the first one of said differential relays, means controlled by said differential relays for operating the other relays of said control relay group in sequence to control the operations of said magnet, and means including a contact set in said chain of contacts controlled by the last operated of said control relays for opening said magnet circuit.

8. In a totalizer system, a total adding machine comprising a counter, storage relays, and an accepting relay, a plurality of ticket machines each arranged to print tickets of a value particular to that machine, collector means for extending a circuit from said adding machine accepting relay to said ticket machines one at a time, a plurality of individual adding machines each comprising a counter, accumulating relays and an accepting relay, means in each ticket machine for selectively extending said circuit from said total adding machine to one of said individual adding machines, control means for said total adding machine, control means common to said plurality of individual adding machines, means in said collector means for extending circuits to said total and common control means, means in said total adding machine control means actuated over said circuit from said collector means for operating that adding machine to register the value of the ticket printed by the ticket machine to which the total adding machine is then connected, and means in said common control means actuated over said circuit from said collector means for simultaneously operating the selected one of said individual adding machines to register the same ticket value therein.

9. In a totalizer system, a total adding machine comprising a counter, storage relays, and an accepting relay, a plurality of ticket machines each arranged to print tickets of a value particular to that machine, a collector for extending a circuit from said total adding machine accepting relay to said ticket machines one at a time, a plurality of individual adding machines each comprising a counter, accumulating relays and an accepting relay, means in each ticket machine for selectively extending said total adding machine accepting relay circuit to one of said individual adding machine accepting relays, control means for said total adding machine, a plurality of conductors leading into said control means, control means common to said plurality of individual adding machines, a plurality of conductors leading into said common control means, means in said collector for extending control circuits to said total and common control means over conductors corresponding to the ticket machine to which the total adding machine is connected, means in said total adding machine control means actuated over the control circuit thereto for operating that adding machine to register the value of the ticket printed by the ticket machine to which that adding machine is connected, means in said common control means actuated over the control circuit thereto for simultaneously operating the selected one of said individual adding machines to register the same ticket value therein, means in said common control means operated at the completion of the registering of said ticket value in said individual adding machine for extending a checking circuit through said total adding machine control means to said total adding machine and over said accepting relay circuit to said ticket machine, and means in said ticket machine operated over said checking circuit for operating the ticket machine to issue a ticket.

10. In a totalizer system, a total adding machine comprising a counter, storage relays, and an accepting relay, a plurality of ticket machines each arranged to print tickets of a value particular to that machine, a collector for extending a circuit from said total adding machine accepting relay to said ticket machines one at a time, a plurality of individual adding machines each comprising a counter, accumulating relays, and an accepting relay, means in each ticket machine for selectively extending said total adding machine accepting relay circuit to one of said individual adding machines, control means for said total adding machine, a plurality of conductors leading into said control means, control means common to said plurality of individual adding machines, a plurality of conductors leading into said common control means, means in said collector for extending control circuits to said total and common control means over conductors corresponding to the ticket machine to which the total adding machine is connected, means in said total adding machine control means actuated over the control circuit thereto for operating that adding machine to register the value of the ticket printed by the ticket machine to which that adding machine is connected, and means in said common control means actuated over the control circuit thereto for simultaneously operating the selected one of said individual adding machines to register the same ticket value therein.

11. In a totalizer system, a total adding machine comprising a counter, storage relays, and an accepting relay, a plurality of ticket machines divided into groups each group printing tickets of value different from the other groups, a control unit in said total adding machine, a control relay in said unit for each value of ticket, a plurality of individual adding machines each comprising a counter, accumulating relays and an accepting relay, a control unit common to said individual adding machines, a control relay in said common control unit for each value of ticket, a collector, means including said collector for establishing a circuit connection between said total adding machine accepting relay, a ticket machine and the accepting relay of one of said individual adding machines, means for operating a control unit relay in each unit corresponding to the value of ticket to be printed by said connected ticket machine, and means controlled by said operated control relays for operating said adding machines to register therein the value of the ticket printed by said ticket machine.

12. In combination, a motor magnet, a pair of contacts closed by an operation of said magnet, a pair of differential relays, means for completing a circuit for said motor magnet to operate the same, circuit means for said differential relays including said motor magnet contacts over which said relays are energized and one is operated, means controlled by said operated relay for opening said motor magnet circuit to restore the magnet, said circuit means for said differential relays including means for operating the second relay upon the opening of said motor magnet contacts, means operated by said second relay for reclosing said motor magnet circuit to re-operate the magnet to reclose said contacts, means controlled over said differential relay circuit means by said second relay for restoring said first relay, control relays, circuit means for said control relays controlled jointly by said first and second differential relays, contacts on said control relays and circuits therefor, comprising, a chain circuit through which said motor magnet circuit extends to permit said control relay means to open the circuit of said magnet after a predetermined number of operations of the magnet.

13. In a totalizer system, a plurality of individual adding machines each comprising, an electromagnetically operated counter, storage relays and a connecting relay, a plurality of paths leading into each one of said adding machines there being a path for each value to be registered in the machine, a control unit common to said plurality of adding machines, a corresponding plurality of paths leading into said control unit, a total adding machine comprising, an electromagnetically operated counter, an accepting relay and storage relays, a total control unit therefor, a corresponding plurality of paths leading into said total control unit, means for connecting said total adding machine to a selected one of said individual adding machines over a selected one of said paths leading into said individual adding machine and for extending a circuit from ground to said common control unit over a corresponding one of said paths leading into said common control unit and for extending a circuit from ground to said total control unit over a corresponding one of said paths leading into the total control unit, means including the connecting relay in the selected one of said individual adding machines for connecting said common control unt to said adding machine, means in said control unit for operating said adding machine to register the value particular to the selected path, and means in said total control unit for operating said total adding machine to register the same value therein.

14. In a totalizer system, a plurality of individual adding machines, each comprising an electro-magnetically operated counter arranged to register two-unit values, storage relays arranged to store one-unit values and a connecting relay, a plurality of paths leading into each one of said adding machines including a path for one-unit values, a control unit common to said plurality of adding machines, a corresponding plurality of paths leading into said control unit, a total adding machine comprising, an electromagnetically operated counter arranged to register two-unit values and storage relays arranged to store one-unit values, a total control unit for said total adding machine, a plurality of paths leading into said total control unit including a path for one-unit values, means for extending a circuit from said total adding machine to a selected one of said individual adding machines over a one-unit value path leading into said individual adding machine, and for extending a circuit to said common control unit over a one-unit value path leading into said common control unit and for extending a circuit to said total control unit over a one-unit value path leading into said total control unit, means including the connecting relay in the selected one of said individual adding machines for establishing circuits from said common control unit to said adding machine, means in said common control unit for operating the storage relays of said adding machine to store a one-unit value therein and for operating the electro-magnetically operated counter in said adding machine when a previous one-unit value is stored in said storage relays, and means in said total control unit for operating the storage relays in said total adding machine to store a one-unit value therein and for operating the electro-magnetically operated counter of said total adding machine when a previous one-unit value is stored in said storage relays.

15. In a totalizer system, a counter, a magnet for operating said counter, a control relay group, a pair of relays included in said group, a circuit for said magnet extending through a chain of contacts in said control relay group, means for closing said circuit to operate said magnet, contact means closed by said magnet, circuit means controlled by said magnet contact means for operating a first one of said pair of relays, said first relay on operating locking itself and opening said magnet circuit to permit the magnet to restore, means for operating the second one of said pair of relays upon the restoration of said magnet to re-establish said magnet circuit to operate the magnet thereover, said magnet re-operating said magnet contact means to restore the first one of said pair of relays, means controlled by said pair of relays for operating the other relays of said control relay group in sequence to control the operations of said magnet, and means including a contact means in said chain of contacts controlled by the last one of said control relays to be operated for opening said magnet circuit.

HAROLD C. ROBINSON.